(12) United States Patent
Benzing et al.

(10) Patent No.: US 6,547,910 B1
(45) Date of Patent: Apr. 15, 2003

(54) METHOD FOR PRODUCING A COVERING ELEMENT MADE OF BREAKABLE MATERIAL

(75) Inventors: Thomas Benzing, Wildberg (DE); Arno Jambor, Vaihingen (DE); Uwe Skrzypek, Krefeld (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/700,047

(22) PCT Filed: Feb. 19, 2000

(86) PCT No.: PCT/EP00/01379

§ 371 (c)(1),
(2), (4) Date: Feb. 22, 2001

(87) PCT Pub. No.: WO00/53434

PCT Pub. Date: Sep. 14, 2000

(30) Foreign Application Priority Data

Mar. 8, 1999 (DE) .......................................... 199 09 869

(51) Int. Cl.[7] .............................. B32B 1/10; B44C 5/04
(52) U.S. Cl. ....................... 156/212; 156/230; 156/236; 156/241; 156/247; 156/267; 156/285
(58) Field of Search ................................ 156/196, 212, 156/230, 241, 245, 247, 267, 285, 236

(56) References Cited

FOREIGN PATENT DOCUMENTS

| DE | 1 948 663 | 4/1971 |
|---|---|---|
| DE | 39 30 603 | 3/1990 |
| DE | 39 40 102 | 6/1990 |
| DE | 41 12 607 | 10/1992 |
| DE | 296 04 026 | 7/1996 |
| DE | 297 12 329 | 10/1997 |
| DE | 198 22 425 | 2/2000 |
| DE | 199 09 642 | 4/2000 |
| EP | 0 586 360 | 3/1994 |
| FR | 2 721 549 | 12/1995 |
| GB | 2 305 148 | 4/1997 |

*Primary Examiner*—Sam Chuan Yao
(74) *Attorney, Agent, or Firm*—Kenyon & Kenyon

(57) ABSTRACT

A method for producing a trim panel with a thin decorative layer on a supporting element. The thin decorative layer is composed of an organic and/or crystalline material which is frangible in a thin layer, in particular natural stone. The method including the steps of: An adhesive and a nonwoven fabric or a film are applied as a plastic fixing film to a surface of the thin decorative layer. A surface of the supporting element later facing the decorative layer is coated with an adhesive. The supporting element is placed with the side not coated with the adhesive into a lower mold. The decorative layer with the plastic fixing film is roughly cut to size and placed with its uncoated surface onto the surface of the supporting element coated with the adhesive and positioned. An elastic element is positioned on the decorative layer with the plastic fixing film. Pressure is applied to the side of the elastic element facing away from the decorative layer, the decorative layer adapting itself to the form of the surface of the supporting element and adhesively bonding to the supporting element. The composite structure composed of the supporting element and the decorative layer is removed from the lower mold and an outer contour of the composite structure composed of the supporting element and the decorative layer is machined to the final dimensions. The plastic fixing film is removed from the decorative layer by the action of heat and/or solvent.

11 Claims, 3 Drawing Sheets

METHOD FOR PRODUCING A COVERING ELEMENT MADE OF BREAKABLE MATERIAL

FIELD OF THE INVENTION

The present invention relates to a method for producing a trim panel with a thin decorative layer on a supporting element, the thin decorative layer being composed of one of an organic and a crystalline material which is frangible in a thin layer.

RELATED TECHNOLOGY

German Patent No. DE 296 04 026 U1 describes a functional part extending essentially two-dimensionally and having a front or covering layer made of a brittle natural material, in particular of a stone or stone-like material, which is frangible in a thin layer. In this case, the front or covering layer is arranged on a supporting layer of a fiber-reinforced material with a plastic matrix. However, the functional part can only be used to a restricted extent as a trim panel for decorative purposes, since its essentially two-dimensional extent does not allow it to be used for trim panels with a three-dimensionally curved surface area.

German Patent No. DE 297 12 329 U1 describes a three-dimensionally curved molded part of composite material, in which the decorative elements are composed of fibers or a fiber mat. The shaping of the part curved in three spatial directions is predetermined by a molded part produced by deep drawing. In the case of this method, however, the use of a brittle material that is frangible in a thin layer is not possible.

German Patent No. DE 39 30 603 A1 also shows a trim panel and a method for producing it, the trim panel having a surface form which is curved in three spatial directions. In this case, the final form is produced by two workpiece molds serving for shaping, an upper mold and a lower mold, by placement into these molds and curing. Consequently, only flexible materials can be used as decorative inserts. The use of a brittle material which is frangible in a thin layer, such as natural stone for example, is not possible on account of the bending of the material of the decorative inserts required for shaping.

German Patent No. DE 39 40 102 A1 describes lightweight composite panels for producing fittings and fixtures with surfaces of natural stone. The lightweight composite panels described there are produced exclusively for the predetermined application purposes. The invention described there consequently relates to the variable, vibration- and torsion-resistant construction of the composite panels according to the area of application, and to the possibilities for joining them together to form three-dimensional bodies and the shaping of their surface. Special refinements of the method relate to the shaping of surface intarsias, bore holes and profiles.

German Patent No. DE 41 12 607 A1 describes a method and a device for coating profiled surfaces of workpieces in panel form. The method mentioned there serves for coating a profiled surface of a workpiece in panel form with a flexible, two-dimensional coating material, such as for example a veneer, a decorative paper or the like. The method in this case includes the following steps: placing the workpiece onto a pressing plate, with the coating material being located over the workpiece and a layer of glue being located on the workpiece and/or the coating material; lowering an unheated molding membrane onto the coating material; evacuating the space between the molding membrane and the lower pressing plate; lowering a heated, elastically extensible pressing membrane onto the molding membrane and subjecting the pressing membrane to pressure.

German Patent DE No. 198 22 425.7, which is not a prior publication, describes a trim panel of the generic type for decorative purposes, in particular in the interior area and here preferably for the interior trim of passenger compartments of vehicles, in which panel a decorative layer of a natural material, here natural stone in particular, is applied to the visible side of a base part. In the case of this method, the decorative natural stone layer can be realized in any desired three-dimensional form. For this purpose, the desired, final surface form is produced by milling from a solid material, involving the use of a large amount of the natural material. The milled layer is in this case held on a supporting element, on which it remains during subsequent use. The method permits a high degree of design freedom, but has the serious disadvantages of long times for working the material and the use of a large amount of material.

German Patent No. DE 199 09 642.2, which is likewise not a prior publication, describes a trim panel and a method for producing it in which a very thin decorative layer, in particular of natural stone, is produced. A kind of "stone veneer" is concerned here. This thin decorative layer is then used to produce the trim panel by placing it into a mold and encapsulating it by pouring or injecting transparent plastic around it.

However, this method suffers from a number of problems, since the decorative layer is not cohesive enough and often breaks up into individual parts during encapsulation. Furthermore, the decorative layer can adapt itself only with difficulty or inadequately to the contour predetermined by the casting mold, since the contour has to allow space above the decorative layer for the plastic on the visible side, resulting in different thicknesses of plastic layer above the decorative layer, which is visually very disadvantageous and gives the trim panel the appearance of distortion and inadequate production accuracy.

SUMMARY OF THE INVENTION

It is therefore an object of the present invention to provide a method for producing a trim panel with a thin decorative layer and a supporting element, the decorative layer being composed of an organic and/or crystalline material which is frangible in a thin layer, and in which the thin decorative layer can be applied to an at least approximately free, three-dimensional geometrical shape of the supporting element.

The present invention provides a method for producing a trim panel with a thin decorative layer on a supporting element, the thin decorative layer being composed of one of an organic and a crystalline material which is frangible in a thin layer, the method comprising: applying a plastic fixing film to a first surface of the thin decorative layer; applying a portion of adhesive to a first surface of a supporting element; placing the second surface of the supporting element into a lower mold; sizing the decorative layer and plastic fixing film; positioning the second surface of the decorative layer adjacent the first surface of the supporting element; positioning an elastic element on the decorative layer the plastic fixing film; applying pressure to a side of the elastic element facing away from the decorative layer so as to adapt the decorative layer to the first surface of the supporting element and so as to adhesively bond the decorative layer to the supporting element as a composite structure; removing the composite structure from the lower mold; machining an outer contour of the composite structure to predetermined dimensions; and removing the plastic fixing film from the decorative layer using at least one of heat and a solvent.

In the case of the method according to the present invention, an advantage is that a plastic fixing film is applied to a surface of the thin decorative layer. This plastic fixing film is composed of an adhesive and a nonwoven fabric or a film. In this context, the nonwoven fabric or the film must be capable of following plastic deformations, for example stretching or plastic extension, without tearing.

The film or the nonwoven fabric is applied with the adhesive to one of the surfaces of the thin, veneer-like decorative layer. A hot-melt adhesive may serve for example as the adhesive, this adhesive usually being applied in any case to the thin decorative layers, in particular those of natural stone, for production reasons. The nonwoven fabric or film can then be fixed on the already present layer of hot-melt adhesive under the effect of heat and be penetrated by the adhesive.

It goes without saying that, apart from the use of hot-melt adhesive, the use of many other types of adhesive is also conceivable. For instance, layers of adhesive bonded directly to the nonwoven fabric or film, in other words a kind of adhesive tape, could be used in particular. The use of multicomponent adhesives would also be a further possibility.

The plastic fixing film formed by the nonwoven fabric or film and the adhesive then allows the thin decorative layer to be adapted to virtually any predetermined form, since for example a natural stone layer can be broken along crystal edges through the plastic fixing film without breaking up. This offers the advantage that three-dimensionally molded surface contours, such as for example narrow, merging radii, can also be provided with the thin decorative layer.

A supporting element, onto which the thin decorative layer is to be applied, is coated with an adhesive on its side later facing the decorative layer. The adhesive should in this case have a color matching the respective decorative layer, since the adhesive fills the small cracks arising in the decorative layer and can consequently be partially seen from the later visible side. As an alternative to this, a transparent adhesive is also conceivable, so that the color of the supporting element, which then has to be appropriately chosen, can show through the cracks.

The supporting element, which at the same time forms the basis for the later trim panel, is placed with the side not coated with adhesive into a lower mold, in order to avoid deformation and distortion of the supporting element and consequently of the trim panel during the process.

The decorative layer is cut roughly to its later desired form, placed with its uncoated surface onto the supporting element and positioned.

To realize the adaptation of the decorative layer with the plastic fixing film to the geometrical shape of the supporting element in a nearly ideal way, in the method according to the present invention an elastic element is positioned on the decorative layer.

Then, pressure is applied to the decorative layer or the elastic element, the decorative layer adapting itself to the form of the supporting element and being adhesively bonded to it. In the process, the elastic element helps to bend the decorative layer into the most ideal possible form about narrow radii and three-dimensional forms and at the same time has the effect, already during the positioning and pressing-down of the decorative layer, of fixing its position on the supporting element, before the decorative layer is subjected to pressure.

When subjected to pressure during the so-called pressing lamination, the thin decorative layer does indeed undergo ruptures, but these take place along micro-structures or crystal edges. In combination with the adhesive which is adapted to the color of the material of the thin decorative layer, and which fills the small cracks arising, a visual impression in which all the properties of the material of the decorative layer are retained virtually completely can be achieved.

After the pressing lamination, the decorative layer then permanently has the desired surface form. The composite structure composed of the decorative layer and supporting element is removed from the lower mold and the outer contour of the composite structure composed of the decorative layer and the supporting element is machined to its final dimensions. This step is necessary, since the decorative layer and the supporting element still have overhanging projections for the pressing carried out during the process, in other words they are made slightly larger than is required for their final outer contour and size. As a result, for example processing-related problems with respect to adhesion and dimensional stability, which occasionally occur in the outermost edge of the trim panels, can simply be "cut off".

For the subsequent removal of the plastic fixing film, heat and/or a solvent is used, depending on the type of adhesive used. In this context, however, it must be ensured that the adhesive which bonds the decorative layer to the supporting element is not likewise incipiently dissolved through the small cracks in the decorative layer. To prevent this, for example, two different adhesives, which do not react to the same solvent, could be used for the plastic fixing film and the bond between the decorative layer and the supporting element.

In one embodiment of the present invention, the composite structure composed of the decorative layer and plastic fixing film is already pre-segmented before placement onto the supporting element.

This pre-segmentation takes place between two surfaces, of which at least one is of an elastic form. An elastic base plate, onto which the decorative layer is placed with the plastic fixing film and rolled over by a roll, may serve for example for this purpose. In the process, the material of the thin decorative layer is broken at material-dependently predetermined crystal structures or other micro-structures. A composite structure which is composed of the decorative layer and plastic fixing film and is pre-segmented in this way can then be laid very pliably around three-dimensional forms and also be pressed uniformly against very narrow radii.

In a further embodiment of the present invention, thermal energy is supplied at the same time as the pressure is applied, so that at least the plastic fixing film is heated.

This produces the advantage that the decorative layer with the plastic fixing film can be pressed far better against the predetermined geometrical forms, since the plastic fixing film can be adapted much more pliably to predetermined geometrical, three-dimensional surfaces as a result of the heating of its adhesive and its fibers or its plastic structure.

A further alternative for the method includes the steps of: applying a plastic fixing film to a first surface of the thin decorative layer; sizing the decorative layer; applying a portion of adhesive to one of a first two-dimensionally developable surface of a supporting element and the second surface of the decorative layer; placing the supporting element into a lower mold; positioning the second surface of the decorative layer adjacent to the second surface of the supporting element; applying pressure the decorative layer using at least one roll in at least one production step so as to adapt the decorative layer the second surface of the supporting element and so as to adhesively bond the decorative layer to the supporting element as a composite structure; machining an outer contour of the composite structure to predetermined dimensions; and removing the plastic fixing film from the decorative layer using at least one of heat and a solvent. The solution presented here is based on the same principle, but is restricted to two-dimensionally developable surfaces which can be rolled over by a roll in their entirety.

The supporting element lies in this case in a lower mold, designed as a rail, and the decorative layer with the plastic fixing film is pressed onto the surface of the supporting element via one or more rolls in a plurality of production steps or one production step in each case. This dispenses in principle with the use of an elastic element, as in the previously described alternatives.

However, in one embodiment of the method, the at least one roll may be elastically formed on its surface, so that the roll can take over at least some of the tasks of the elastic element.

Otherwise, this variant of the method also offers the advantages already described with respect to the adaptation of the decorative layer to the surface contour of the trim panel predetermined by the supporting element.

A further method, which presents an alternative solution which is likewise based on the same or a similar solution principle and has advantages which are comparable to the methods already described, includes the steps of: applying a plastic fixing film to a first surface of the thin decorative layer so as to form a first composite structure; segmenting the first composite structure; sizing the decorative layer; applying a first portion of contact adhesive to the second surface of the decorative layer; applying a second portion of contact adhesive to a first surface of a supporting element; placing the second surface of the supporting element into a lower mold; positioning the second surface of the decorative layer adjacent to the first surface of the supporting element; applying pressure to the first surface of the decorative layer so as to form a second composite structure; removing the composite structure from the lower mold; machining an outer contour of the composite structure to predetermined dimensions; and removing the plastic fixing film from the decorative layer using at least one of heat and a solvent.

In the case of this method, the adhesive bonding of the decorative layer and the supporting element takes place by means of a contact adhesive.

To achieve an ideal adaptation of the thin decorative layer to the surface, it is essential in this method for the decorative layer with the plastic fixing film to be segmented (or pre-segmented), so that, by contrast with the methods mentioned above, this pre-segmenting step already described above must be seen here not as a possible way of enhancing quality but as a necessary production step.

The pre-segmentation is essential here, since adaptation of the decorative layer to the surface of the supporting element is no longer possible to the extent which was the case with the methods described above as a result of the contact adhesive and consequently the fact that the decorative layer adheres to the supporting element immediately on contact.

After the pre-segmentation, the composite structure composed of the plastic fixing film and the decorative layer is roughly cut to size and the surface of the decorative layer facing away from the plastic fixing film and the surface of the supporting element later facing the decorative layer are in each case coated with contact adhesive.

Here, too, the supporting element is placed into a lower mold and the two surfaces coated with contact adhesive are positioned. Only then are the two layers brought into contact with each other. Pressure can then be applied uniformly and specifically to the decorative layer, the entire surface of the decorative layer having to be worked. The decorative layer is in practice rubbed onto the surface contour of the supporting element. The contact adhesive is thereby activated and adhesively bonds the decorative layer to the supporting element.

Here, too, it is necessary to ensure an appropriately chosen coloration of the adhesive and/or the supporting element.

Since, in a particularly favorable embodiment of the present invention, thermal energy can be supplied in this method step, the rubbing on of the decorative layer can then also be understood as a kind of "ironing on".

This last-described method of production is suitable in particular whenever in the case of small series or prototypes the trim panels are to be produced manually.

In the case of all the methods described, in a particularly advantageous and favorable embodiment it is suitable finally to provide the visible surface of the decorative layer with a transparent protective layer, in particular at least one transparent coating.

To achieve ideal visual properties of the trim panel in the case of all the methods, it is suitable either to color the plastic fixing film to match the decorative layer or to use a transparent plastic fixing film and to make the supporting element lying under it of a color matching the material of the thin decorative layer.

BRIEF DESCRIPTION OF THE DRAWINGS

Further advantageous forms of the method of production emerge from the examples of the method described in more detail below with reference to the drawings, in which.

DETAILED DESCRIPTION

Figure 1:
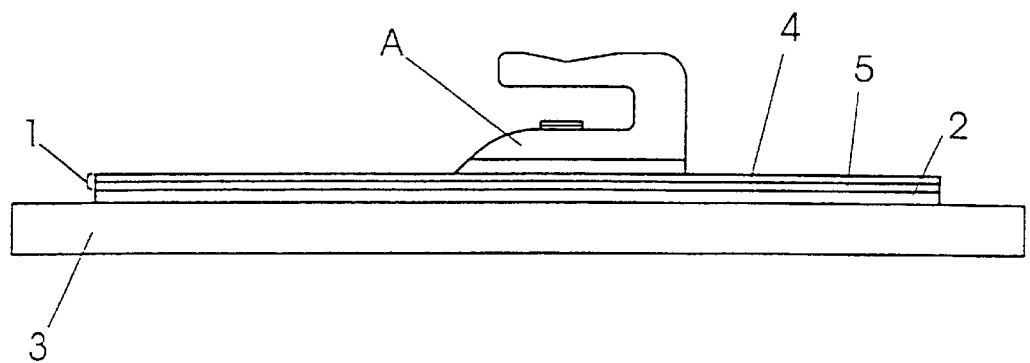
FIG. 1 shows a basic representation of the application of a plastic fixing film.

FIG. 1 shows in principle how a plastic fixing film 1 is applied to a thin decorative layer 2, in particular a stone layer 2. Stone layer 2 lies in this case on a planar base plate 3, which serves here as a work support.

A very simple and effective method consists in using a nonwoven fabric 4 or a film 4 as plastic fixing film 1 and fixing it on stone layer 2 by means of a hot-melt adhesive 5. This method step is indicated in principle in FIG. 1 by iron A.

To make it possible to see the construction of stone layer 2 with plastic fixing film 1 in FIG. 1, the thicknesses of the layers have been greatly exaggerated. In reality, stone layer 2 has a layer thickness of only 0.1 to at most 1.0 mm; plastic fixing film 1 has a layer thickness of approximately the same order of magnitude.

In all the variants of the method, this covering of stone layer 2 with plastic fixing film 1 takes place as the first step. Specifically when a hot-melt adhesive 5 is used, a separating layer (not represented) is at the same time inserted between the heat source, symbolized by iron A, and plastic fixing film 1. A nonwoven fabric paper cloth, which at the same time can absorb excessive adhesive, is particularly well suited.

Before the central method step, represented in the following figures in various variants of the method, the composite structure composed of stone layer 2 and plastic fixing film 1 is roughly cut to an approximate projection of the form of a supporting element 6. In this context, the roughly cut-to-size blank is slightly larger than supporting element 6. Furthermore, the supporting element 6 is also made to be slightly larger than its final outer contour or dimensions would require. These overhanging regions are only cut off after the central method step, on the composite structure composed of supporting element 6 and decorative layer 2. This cutting off usually takes place by milling the composite structure composed of supporting element 6 and decorative layer 2 to its final outer contour and size.

Figure 2:
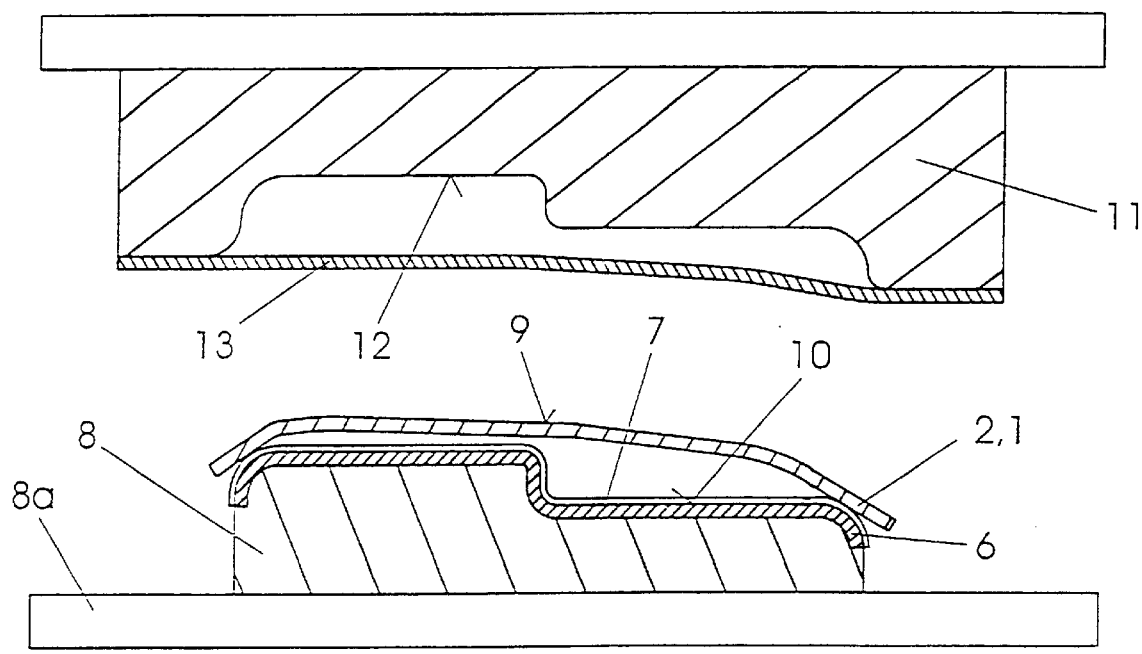
FIG. 2 shows a basic sectional representation of the pressing lamination of a trim panel by means of a lower mold and an upper mold.

FIG. 2 symbolizes the actual, central method step, in which stone layer 2 is bonded to supporting element 6. This bonding takes place by means of an adhesive 7, which is applied either to supporting element 6 or to the side of stone layer 2 facing supporting element 6, depending on the method of production. In this case, plastic fixing film 1 also lies between adhesive 7 and stone layer 2 or on a visible surface 9 of stone layer 2 of the later trim panel, depending on the variant of the method.

In order not to obtain any deformations of supporting element 6 during the process, supporting element 6 lies in a lower mold 8 with a base plate 8a. Adhesive 7 and stone layer 2 with plastic fixing film 1 are applied on a surface 10 of supporting element 6 facing decorative layer 2 of the later trim panel.

An upper mold 11 is arranged above later visible surface 9 of stone layer 2. An exactly matching negative contour 12 of the later trim panel is machined into upper mold 11. This negative contour 12 is covered by an elastic element 13, for example a rubber cloth 13.

When upper mold 11 is then moved towards lower mold 8, first of all rubber cloth 13 comes into contact with stone layer 2 and plastic fixing film 1. During further pressing down of upper mold 11, stone layer 2 is fixed by rubber cloth 13 in a defined position in relation to supporting element 6, and during closing of the two molds 8, 11, stone layer 2 is brought into its final surface shape by negative contour 12.

The pressing lamination of supporting element 6 with stone layer 2 is made possible in the first place by the use of plastic fixing film 1 and is ideally assisted by rubber cloth 13, since this helps to press the composite structure composed of plastic fixing film 1 and stone layer 2 with an exact fit against the predetermined radii of the later trim panel.

Apart from this holding-down function of elastic rubber skin 13, it also protects negative contour 12 in upper mold 11 from wear and, with selection of an appropriate material for rubber cloth 13, makes it unnecessary for a release agent to be introduced into negative contour 12 or onto stone layer 2 with plastic fixing film 1. Furthermore, rubber cloth 13 compensates for production-related differences in the layer thickness of stone layer 2 and tolerance deviations of supporting element 6.

In a further variant of the method, rubber cloth 13 is simply placed over positioned decorative layer 2 before the pressure is applied. This procedure allows similar technical possibilities for the method with respect to the pre-fixing, holding-down and pressing-on operations, merely dispensing with the wear protection of upper mold 8.

Figure 3:
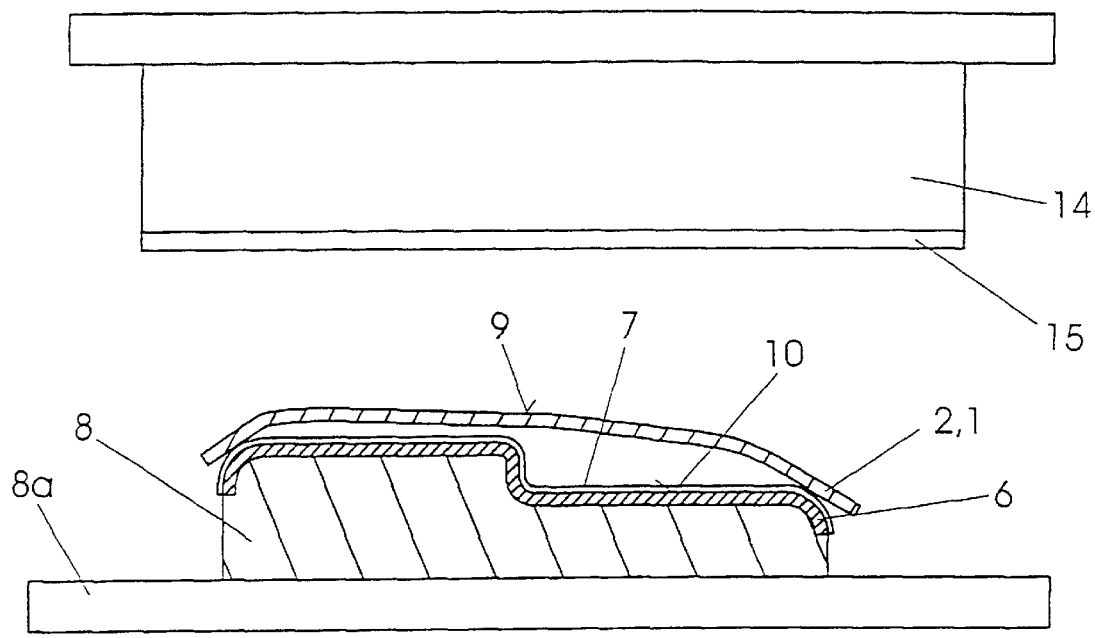
FIG. 3 shows a basic sectional representation of the pressing lamination of the trim panel by means of a lower mold and a fluid press.

FIG. 3 shows a further alternative of the method, in which a fluid press 14 is used instead of an upper mold 11. This fluid press 14 has an incompressible fluid inside it. An elastic underside 15 of fluid press 14 allows it to adapt itself to any desired contour and stone layer 2 is pressed into its final form, predetermined by supporting element 6, by a relative movement of fluid press 14 in the direction of lower mold 8. The tasks of elastic element 13 described above are in this case taken over by elastic underside 15 of fluid press 14.

Here, too, stone layer 2 is applied to supporting element 6 by pressing lamination, plastic fixing film 1 and elastic underside 15 of fluid press 14 ensuring that stone layer 2 breaks exactly according to the form, along the geometrical contour predetermined by supporting element 6, and thus adapts itself ideally to surface 10 of supporting element 6.

Figure 4:
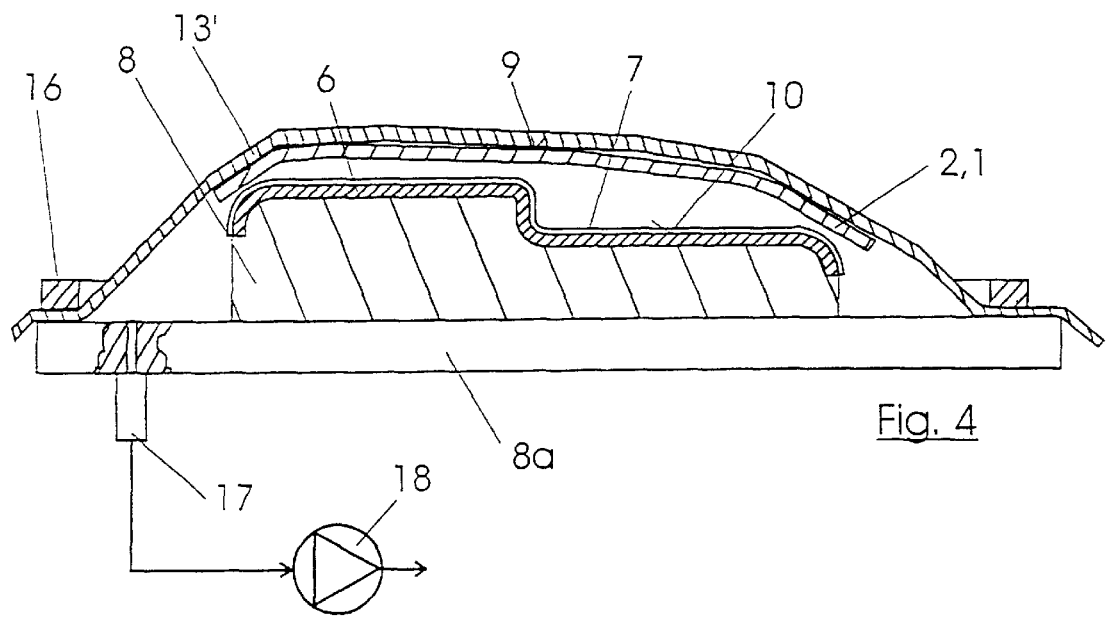
FIG. 4 shows a basic sectional representation of the pressing lamination of the trim panel by means of a lower mold and vacuum pressing.

FIG. 4 illustrates a further alternative embodiment of the method, in which the elastic element 13 must be of a gas-tight form, for example a gas-tight rubber skin 13'. Rubber skin 13' is connected in a gas-tight manner to base plate 8a of lower mold 8 by means of a fastening and sealing frame 16. Under rubber skin 13' there is in this case the same construction including lower mold 8, supporting element 6, adhesive 7 and stone layer 2 with plastic fixing film 1, as already described in the previous exemplary embodiments.

This construction is connected to a vacuum pump 18 via a connection nozzle 17 and the space between lower mold 8, base plate 8a and rubber skin 13' is evacuated in the best possible way. As a result, the ambient air pressure has the effect that stone layer 2 is pressed by rubber skin 13' onto supporting element 6, and the pressure required for the bond between supporting element 6, adhesive 7 and stone layer 2 is applied by this vacuum pressing.

Figure 5:
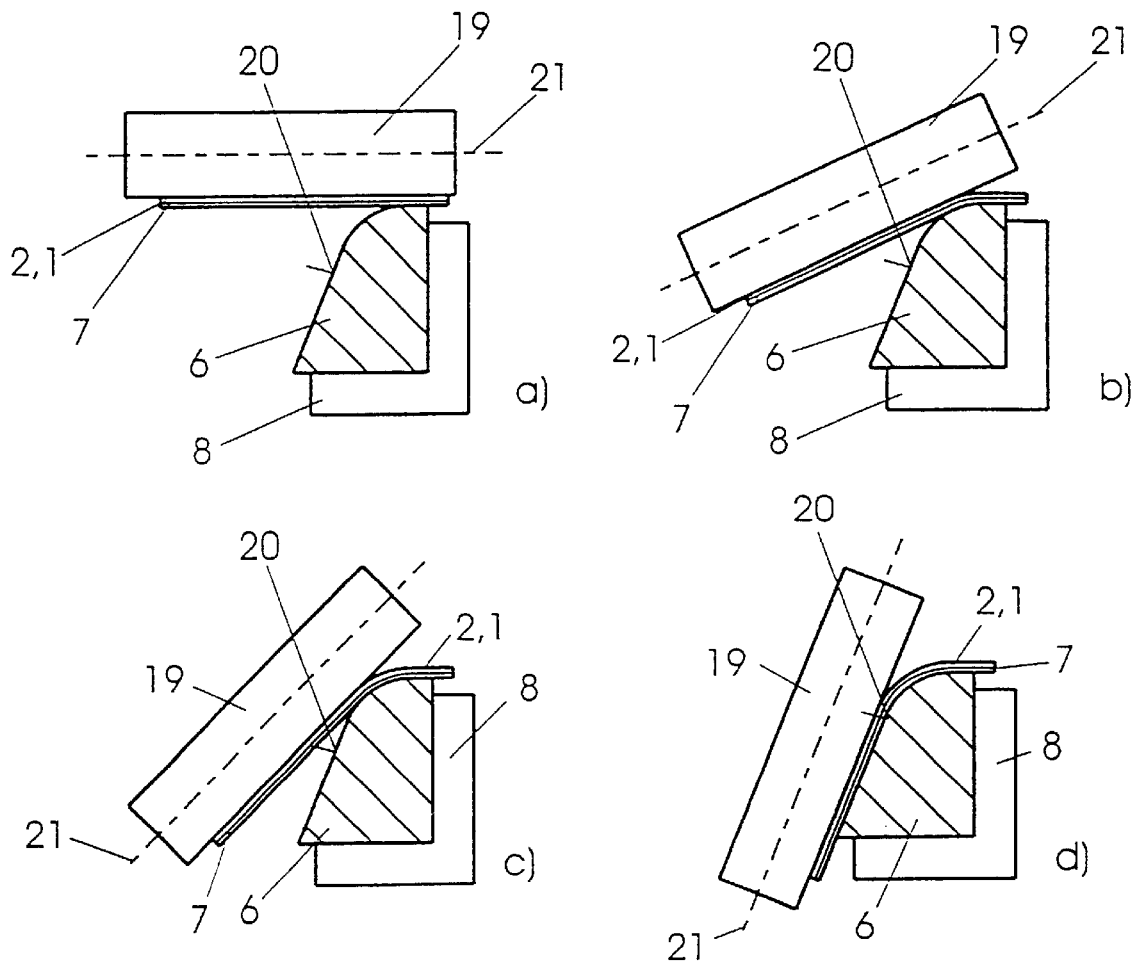
FIG. 5 shows a number of method steps for applying the decorative layer by rolling.

FIG. 5 shows an alternative embodiment which, however, is suitable exclusively for the production of trim panels whose surface form can be two-dimensionally developed.

Here, a roll 19 is used for pressing and adhesively bonding stone layer 2, coated with adhesive 7, with plastic fixing film 1 onto supporting element 6. As an alternative to this, however, supporting element 6 may also be coated (not represented) with adhesive 7 on its surface 20 later facing decorative layer 2. During production steps a) to d), supporting element 6 lies in a lower mold 8 designed as a rail corresponding to the two-dimensionally developable form of supporting element 6.

If roll 19 is provided with an elastic surface, this can, as a result of its elasticity, take over at least some of the tasks of elastic element 13.

Tilting roll 19 about its axis 21 can achieve the effect that stone layer 2 is adapted to and pressed onto the entire surface contour of supporting element 6 by repeated rolling over. In this respect, FIG. 5 reveals four production steps a) to d), which differ mainly by the position of axis 21 of roll 18 and the already applied portion of decorative layer 2.

As an alternative to this, here, too, a plurality of rolls 19 are conceivable, the production steps a) to d) represented being performed in production processes arranged one after the other.

Figure 6:
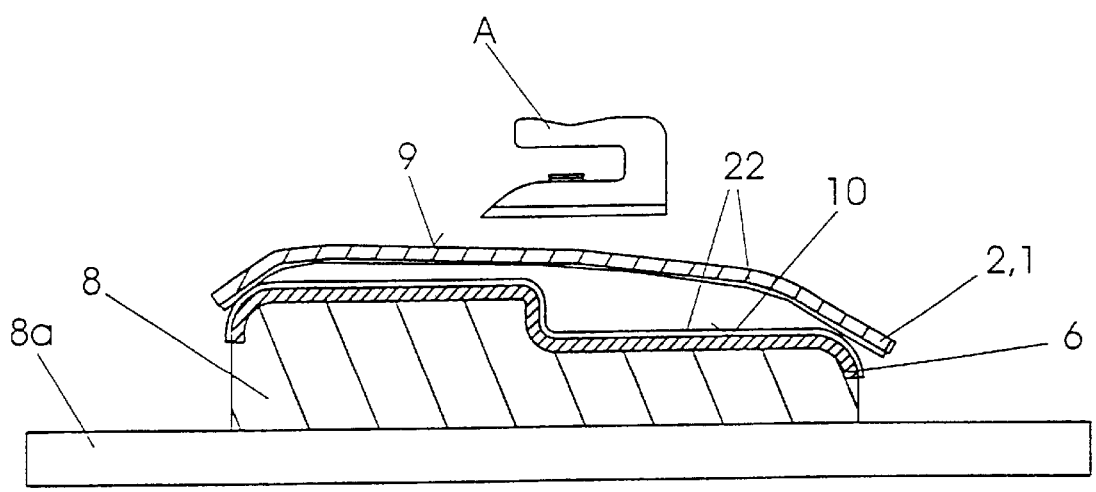
FIG. 6 shows a basic representation of a manual laminating method for producing the trim panel.

A further alternative method of production is represented in principle in FIG. 6. This method is suitable in particular for manual implementation and is consequently predestined for the production of small series and prototypes.

In the case of this method, stone layer 2 with plastic fixing film 1 is provided with a contact adhesive 22 on its side later facing the supporting element. Surface 10 of supporting element 6 later facing stone layer 2 is likewise coated with contact adhesive 22. In order not to deform relatively soft supporting element 6 during the process, here, too, it is placed into a lower mold 8. Thereafter, the composite structure composed of stone layer 2 and plastic fixing film 1 is roughly cut to size and positioned over supporting element 6. By the action of pressure and temperature, indicated in FIG. 6 by iron A, stone layer 2 is adhesively bonded to supporting element 6.

In all the variants of the method, after the pressing lamination of supporting element 6 with stone layer 2 the outer contour of the composite structure composed of supporting element 6 and stone layer 2 is machined to the final form and size.

The best quality results can be achieved at present if plastic fixing film 1 is applied on the later visible side of the trim panel or stone layer 2. This means that, in a subsequent method step after the actual pressing lamination, plastic fixing film 1 has to be removed again from stone layer 2. However, the use of solvents and/or supply of heat means that this does not present any problem.

Thereafter, surface 9 of the stone layer on the visible side must in any case be cleaned in all the variants of the method, in order to prepare it for the subsequent application of a transparent protective layer, in particular one or more transparent coatings.

For all the methods described, various types of adhesive can in principle be used. These may be colored in a color matching stone layer 2 or transparent adhesives may be used. Apart from the method to be implemented manually, in which contact adhesives 22 are preferably used, all the known adhesives are conceivable in the other alternatives of the method. These could be, for example, hot-melt adhesive, but double-sided adhesive tapes or the like are also conceivable. Similarly, an adhesive which is controllable by adding chemicals or energy only in the method step in which the pressure is applied to stone layer 2 could be used.

What is claimed is:

1. A method for producing a trim panel with a thin decorative layer on a supporting element, the thin decorative layer being composed of at least one of an organic and a crystalline material which is frangible in a thin layer, the method comprising:

applying a plastic fixing film to a first surface of the thin decorative layer;

applying an adhesive to a first surface of a supporting element;

placing a second surface of the supporting element into a lower mold;

sizing the decorative layer and plastic fixing film;

disposing a second surface of the decorative layer adjacent the first surface of the supporting element;

disposing an elastic element on the decorative layer having the plastic fixing film;

applying pressure to a side of the elastic element facing away from the decorative layer so as to adapt the decorative layer to the first surface of the supporting element and so as to adhesively bond the decorative layer to the supporting element as a composite structure;

removing the composite structure from the lower mold;

machining an outer contour of the composite structure to predetermined dimensions; and removing the plastic fixing film from the decorative layer using at least one of heat and a solvent.

2. The method as recited in claim 1 wherein the decorative layer includes natural stone.

3. The method as recited in claim 1 wherein the plastic fixing film includes a second adhesive and at least one of a nonwoven fabric and a film.

4. The method as recited in claim 1 further comprising segmenting the decorative layer after the applying of the plastic fixing film.

5. The method as recited in claim 1 further comprising supplying thermal energy at a same time as the applying of the pressure so as to heat at least the plastic fixing film.

6. The method as recited in claim 1 wherein the pressure is applied using an upper mold.

7. The method as recited in claim 6 wherein the elastic element is bonded to the upper mold at an area of a negative contour defined by the upper mold.

8. The method as recited in claim 1 wherein the elastic element includes a gas-tight elastic skin connected in a gas-tight manner to the lower mold so as to generate a negative pressure between the lower mold and the elastic skin.

9. The method as recited in claim 1 wherein a fluid press is used in applying the pressure and wherein the elastic element includes an elastic underside of the fluid press.

10. The method as recited in claim 1 further comprising providing the decorative layer with a transparent protective layer.

11. The method as recited in claim 1 wherein the machining of the outer contour includes milling.

* * * * *